Figure 1:
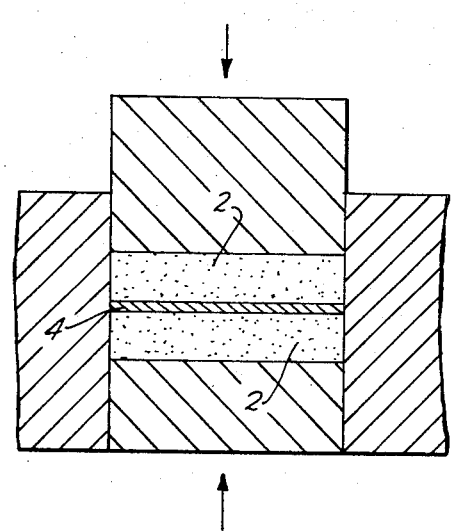

United States Patent
Dey

[15] 3,658,592
[45] Apr. 25, 1972

[54] LITHIUM-METAL CHROMATE ORGANIC ELECTROLYTE CELL

[72] Inventor: Arabinda N. Dey, Needham, Mass.

[73] Assignee: P. R. Mallory & Co., Inc., Indianapolis, Ind.

[22] Filed: July 15, 1970

[21] Appl. No.: 55,167

[52] U.S. Cl. ............................................. 136/6, 136/83 R
[51] Int. Cl. ......................................................... H01m 35/00
[58] Field of Search .................... 136/83, 137, 136, 100, 154, 136/6

[56] References Cited

UNITED STATES PATENTS

| | | | |
|---|---|---|---|
| 1,560,379 | 11/1925 | Darimont | 136/137 |
| 2,001,978 | 5/1935 | Ruben | 136/83 |
| 2,921,111 | 1/1960 | Crowley et al. | 136/100 |
| 3,415,687 | 12/1968 | Methlie | 136/100 |

*Primary Examiner*—Anthony Skapars
*Attorney*—Robert Levine

[57] ABSTRACT

This invention relates to high energy density cells comprising positive electrodes composed of any of the chromates of silver, copper, iron, cobalt, nickel, mercury, thallium, lead and bismuth, and their mixtures; negative electrodes composed of any of the light metals such as Li, Na, K, Ca, Be, Mg, and Al, said electrodes being disposed in an electrolyte comprising an organic solvent selected from the group consisting of tetrahydrofuran, N-nitrosodimethylamine, dimethyl sulfite, propylene carbonate, gamma-butyrolactone, dimethyl carbonate, dimethoxy ethane, acetonitrile, dimethyl sulfoxide, dimethyl formamide and the mixtures thereof: and having dissolved therein soluble salts of the light metals, for example, the perchlorates, hexafluorophosphates, tetrafluoroborates, tetrachloroaluminates, hexafluoroarsenates of lithium.

11 Claims, 8 Drawing Figures

Patented April 25, 1972

3,658,592

3 Sheets-Sheet 1

INVENTOR
ARABINDA N. DEY
BY
ATTORNEY

LITHIUM-METAL CHROMATE ORGANIC ELECTROLYTE CELL

This invention relates to high energy density organic electrolyte cells and batteries employing light metal anodes and metal chromate cathodes.

The gravimetric energy density of a current producing electric cell can be expressed in units of watt-hours/lb. Low equivalent weight of active materials and high electrochemical potential difference between anode and cathode contribute to high gravimetric energy density. In conventional cells with agueous electrolytes (acid, alkali or neutral) the theoretical energy density is limited to low values, such as 118 w.hr/lb for Zn/HgO cell. Because of the intrinsic property of water to decompose at voltages in excess of 1.23 volts approximately, aqueous systems with higher voltages gradually decompose and lose their capacity. Use of organic electrolyte avoids such difficulties and it is possible to develop cells with high voltage and high energy density. Cells with lithium anodes in organic electrolytes have been used previously. However, some of the problems encountered with these systems were the solubility of depolarizer in the electrolyte, the reactivity of the depolarizer with the electrolyte, poor utilization and high polarization of the depolarizers. These cause the cells to have very poor shelf life and low practical energy density. These problems have been solved according to this invention by discovering a new class of depolarizers, viz. metal chromates. To my knowledge these depolarizers have never been used in conjunction with the lithium and other light metal anodes in the organic electrolytes to be specified in this invention. The chemical stability of the depolarizers with the organic electrolyte in question and the electronic conductivity of the reduced product, e.g., metal, make the material uniquely suitable for the novel energy density organic electrolyte cells with high shelf life and good current capability. The theoretical energy density of these lithium-metal chromate cells are very high, e.g. 350–400 w.hr/lb.

In certain commercial applications, a further requirement of the electrochemical cell was to provide a relatively steady output voltage on a constant loading throughout the life of the battery. The light metal anode and certain metal chromate cathode organic electrolyte cells meet the above requirement to a desirable extent.

It is an object of the present invention to provide an organic electrolyte cell with high voltage. It is another object of the present invention to provide an organic electrolyte cell with high energy density.

It is a further object of the invention to provide an organic electrolyte cell with high shelf life and high material utilization.

It is an additional object of the invention to provide an organic electrolyte cell exhibiting relatively steady output voltage throughout the predominant extent of active cell life.

It is also within contemplation of the present invention to provide suitable organic electrolyte cell wherein the cell electrodes are chemically and dimensionally stable and exhibit absolutely no gas evolution under any circumstances.

Other and further objects and advantages of the present invention will become apparent from the following description.

Broadly stated, according to the principles of the present invention, there is provided an electric cell comprising a light metal anode, a metal chromate cathode, and an organic electrolyte. Light metal anodes suitable for the purposes of the present invention may be composed of lithium, sodium, potassium, beryllium, calcium, magnesium, aluminum, and the like as defined in the U.S. Pat. No. 3,413,154 to which reference is hereby made. The preferable anode material is lithium.

The depolarizers used in the present invention are the metal salts of the oxyacids of chromium. The chromates and dichromates of copper, silver, iron, cobalt, nickel, mercury, thallium, lead, and bismuth and mixtures thereof are particularly suitable as depolarizers.

Suitable electrolyte may be made by dissolving organic or inorganic salts of light metals in the organic solvents. For example, 1 to 2 molar solutions of lithium perchlorate or lithium aluminum chloride in tetrahydrofuran solvent constitute a suitable organic electrolyte. Other light metal salts such as perchlorate, tetrachloroaluminate, tetrafluoborate, chloride, hexafluophosphate, hexafluoarsenate, etc. dissolved in organic solvents like propylene carbonate, dimethyl sulfite, dimethyl sulfoxide, N-nitrosodimethylamine, gamma-butyrolactone, dimethyl carbonate, methyl formate, butyl formate, acetonitrile and N:N dimethyl formamide, can be used as electrolytes.

The metal chromate cathodes are fabricated by mixing a mixture of powdered metal chromate and graphite as a conductive diluent in 7:3 weight ratio with 3 percent by weight of an aqueous dispersion of polytetrafluroethylene sometime referred to as colloidal Teflon R which acts as a binder. Sufficient amount of an organic solvent such as isopropanol is then added to the mix to form a paste. The paste is then thoroughly mixed to form an easily pliable dough 2. Metal chromate cathodes are molded on an expanded nickel current collector 4, by placing the above dough on the current collector which in turn is placed in a rectangular die, and then pressing the dough at pressures of 70–80,000 lbs/in$^2$. The process is schematically shown in FIG. 1. The excess isopropanol is squeezed out of the dough and it results in a compact rectangular cathode 8 with adequate mechanical integrity. The cathode is then dried in air and cured at a temperature of 300° C for 2 hours. The curing process enhances the mechanical integrity of the cathode even further. The electrical conductivity of the cathode is found to be quite adequate. In the above mentioned method of electrode fabrication, the weight ratios of metal chromate and graphite can be varied from 24:1 to 1:1. The preferred ratio is 7:3. The amount of the binder can be varied from 1 percent by weight to 10 percent by weight of the above mix. The preferred amount is 3 percent. The chemical nature of the binder can be varied to a wider extent. This includes both organic and inorganic compounds. The example of organic binders are colloidal Teflon, polyethylene dissolved in xylene, ethyl cellulose dissolved in xylene and so forth. The example of inorganic binders are plaster of pairs, water soluble alkali metal silicates and so forth. The only restriction in choosing a binder is that it has to be insoluble in the organic electrolyte. The organic solvents that can be used in the above method of cathode fabrication are isopropanol, ethyl alcohol, methyl alcohol and so forth. The pressures that can be used for the cathode molding operation can be varied from 2,000 lbs/in$^2$ to 150,000 lbs/in$^2$. Preferred pressure is 70,000 lbs/in$^2$. The curing temperature can be varied from 100° C to 400° C and the curing time should also be varied according to the temperature. The curing time decreases with increase in the temperature.

Figure 2:
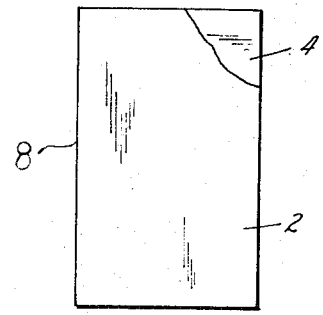
Figure 4:
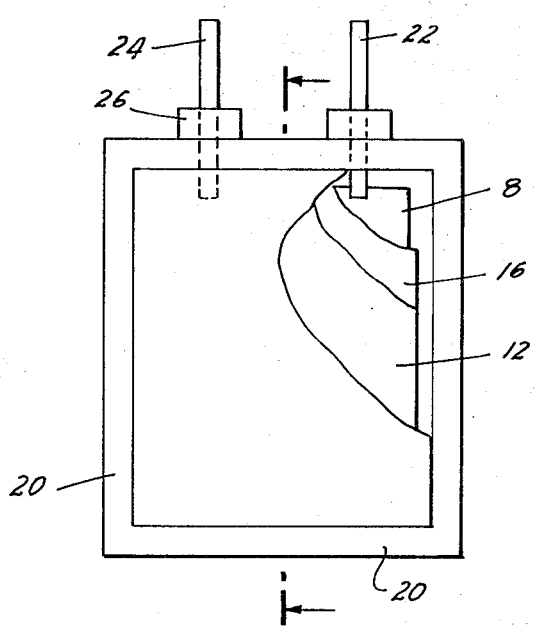
Figure 3:
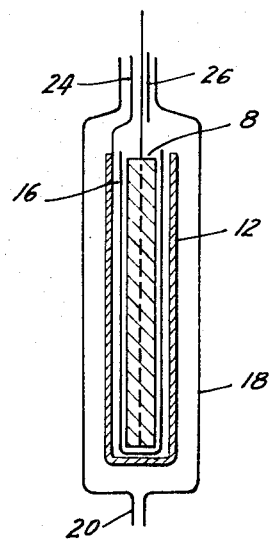

A corner of the metal chromate cathode, made according to the above procedure, is scraped to bare the current collector to which the tab is spot welded for electrical connection. The finished cathode 8 is shown in FIG. 2. The cathode is used in conjunction with two lithium anodes 12 prepared by pressing two rectangular pieces of lithium metal, 0.02 inch thick, on expanded stainless steel, to construct a lithium-metal chromate cell, in parallel plate configuration as shown in FIG. 3. A layer of filter paper 16 is interposed between the lithium anode and the metal chromate cathode, to provide a separator and electrolyte absorber. The sectional view of the cell is shown in FIG. 3. The cell is enclosed in a foil-laminate enclosure 18 by seals 20, to result in a foil-laminate enclosure according to the method of packaging and sealing described in the copending application Ser. No. 822,661 filed on May 7, 1969, entitled "Expandable Casing for Electrochemical Cells" and assigned to the present assignee. 3 cc. of 1M. solution of LiClO$_4$ in tetrahydrofuran is then added to the cell and the cell is heat sealed permanently. The top view of the cell with partial cut-outs is shown in FIG. 4. The cells are cathode limited, i.e. the cathode has a lower capacity than the anode.

The lithium-metal chromate cells are discharged using a constant current of 4.5 ma. corresponding to a current density of 1 ma./cm.$^2$ based on the geometric area of both sides of the cathode. This would correspond to a 20-30 hour rate. The operating characteristics of the several lithium-metal chromate cells, under the above type of load, is shown in Table 1.

Table 1. Operating Characteristics of the Lithium-Metal Chromate Cells.

| Cell | Open Circuit Voltage | Initial Operating Voltage | Average Operating Voltage |
|---|---|---|---|
| Li/CuCrO$_4$ | 3.6 | 2.3 | 2.0 |
| Li/Ag$_2$CrO$_4$ | 3.5 | 2.8 | 2.4 |
| Li/HgCrO$_4$ | 3.5 | 2.5 | 2.3 |
| Li/PbCrO$_4$ | 3.1 | 2.3 | 1.6 |
| Li/CoCrO$_4$ | 3.0 | 2.3 | 1.4 |

All the cells showed exceedingly high open circuit and operating voltages compared to conventional alkaline cells.

Figure 5:
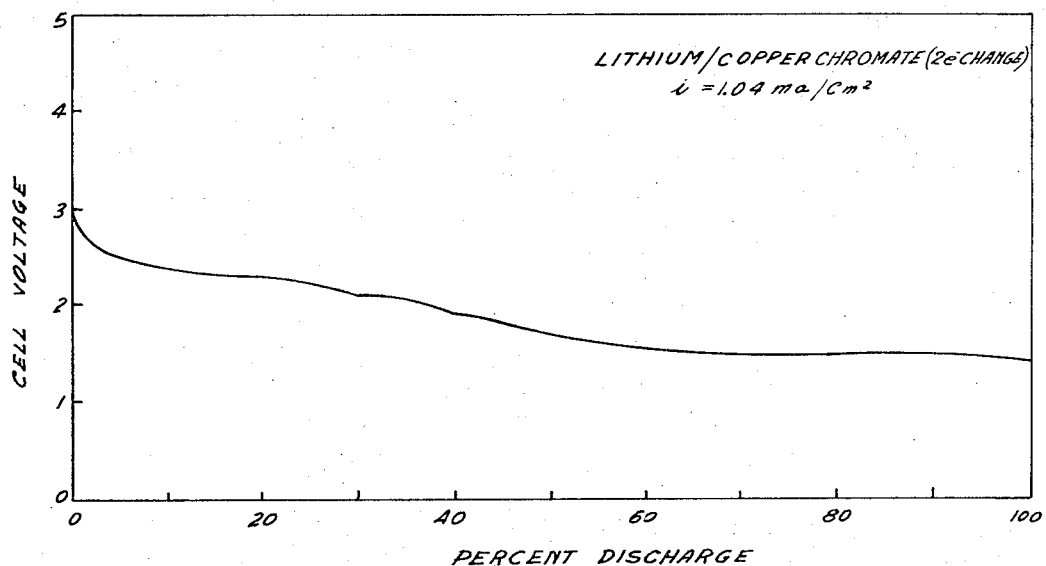

The cell voltage versus fraction of the cathode capacity discharged plot of the Li/CuCrO$_4$ cell is shown in FIG. 5. The cathodic reaction assumed for the calculation of the cathode capacity is:

$$CuCrO_4 + 2Li^+ + 2e \rightarrow Cu + Li_2CrO_4 \quad (1)$$

It is evident from FIG. 5 that the cathode utilization efficiency is close to 100 percent. The theoretical energy density of the above cell, based on the open circuit voltage and the above cell reaction is 400 w.hr/lb.

Figure 6:
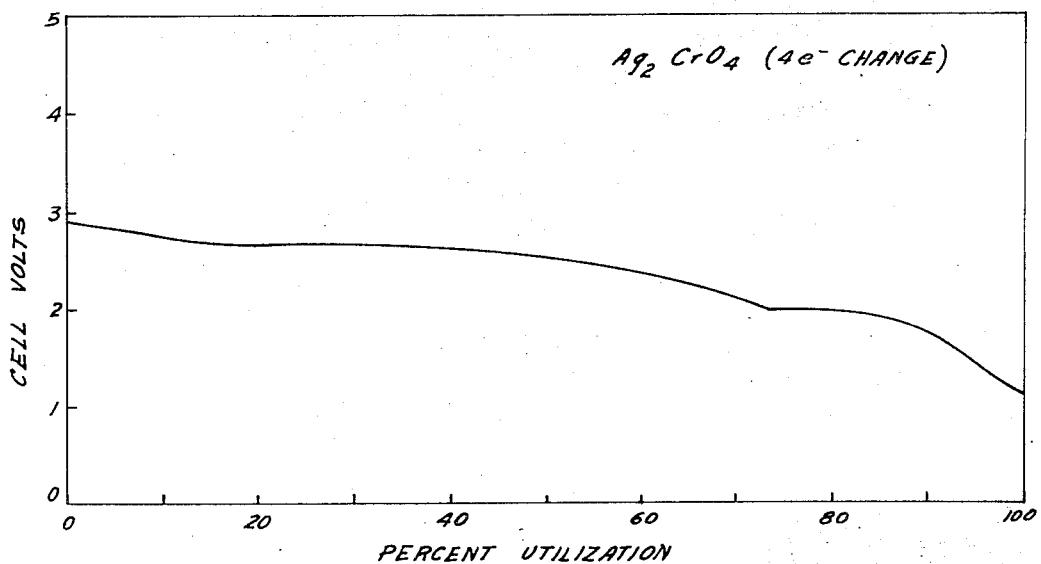

The similar discharge curve for the Li/Ag$_2$CrO$_4$ cell is shown in FIG. 6. The cathodic reaction is assumed to be $$Ag_2CrO_4 + 4Li^+ + 4e \rightarrow 2Ag + CrO_2 + 2Li_2O \quad (2)$$

The cathode utilization efficiency is again found to be 100 percent. The system is also remarkable for its exceptionally high operating voltage.

Figure 7:
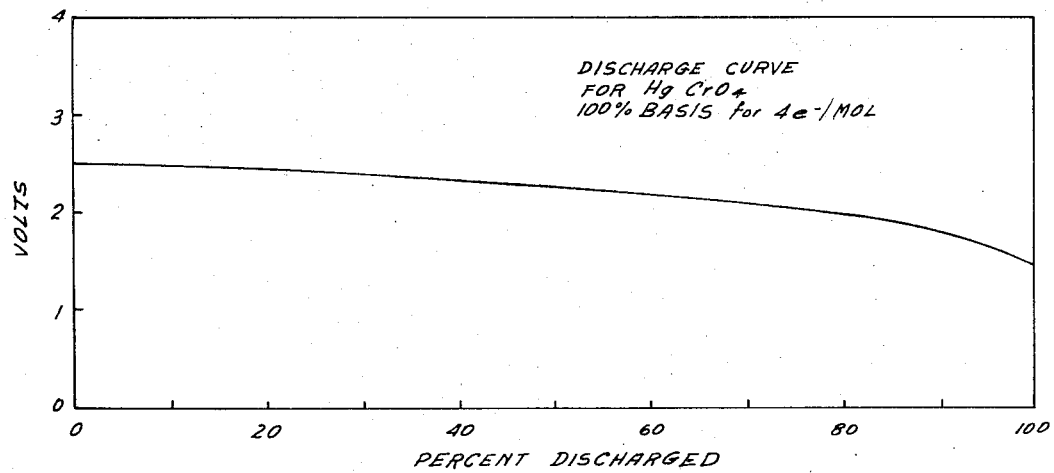

The discharge curve for the Li/HgCrO$_4$ cell is shown in FIG. 7. The cathodic reaction in this case is assumed to be $$HgCrO_4 + 4Li^+ + 4e \rightarrow Hg + CrO_2 + 2Li_2O \quad (3)$$

The material utilization efficiency again is 100 percent. The exceedingly stable high voltage of the cell is of particular importance. The theoretical gravimetric energy density of the cell is computed to be 396 w.hr/lb. The volumetric energy density of the cell is also very high because of the high density of the the HgCrO$_4$.

Figure 8:
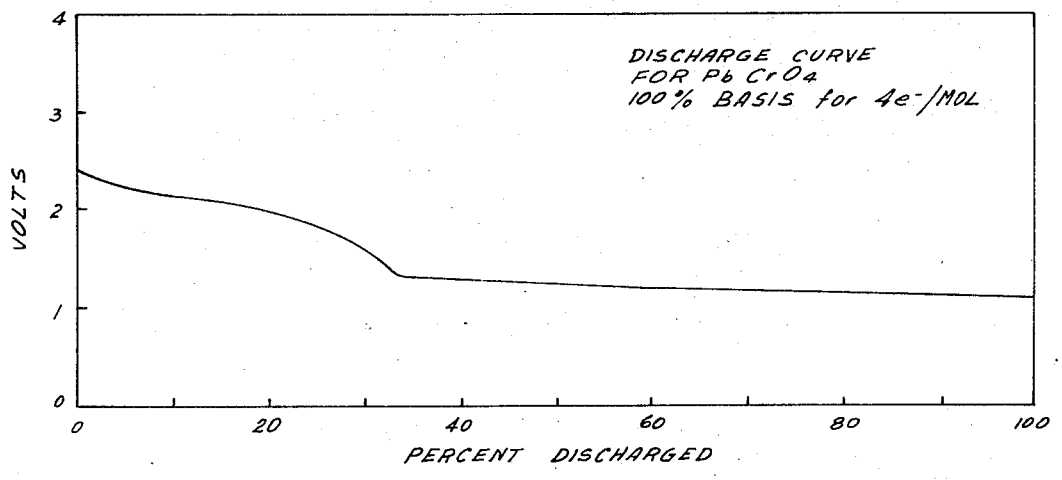

The discharge curve of the Li/PbCrO$_4$ cell is shown in FIG. 8. The corresponding cathodic reaction is $$PbCrO_4 + 4Li^+ + 4e \rightarrow Pb + CrO_2 + 2Li_2O \quad (4)$$

The material utilization efficiency for this cell is high. The theoretical energy density is 559 w.hr.lb. The cell appears to have two voltage plateaus.

In all the above cells the anodic reaction is $$Li \rightarrow Li^+ + e \quad (5)$$

I claim:

1. A high energy density cell comprising a positive electrode composed of a metal chromate graphite in the weight ratios of 1 to 24 parts of metal chromate to 1 part of graphite and a binder in an amount of 1–10 percent by weight of the electrode, said chromate being selected from the group consisting of silver, copper, iron, cobalt, nickel, mercury, thallium, lead and bismuth chromates, and mixtures thereof; negative electrodes composed of light metals selected from the group consisting of Li, Na, K, Ca, Be, Mg, and Al, said electrodes being disposed in an electrolyte comprising an organic solvent selected from the group consisting of tetrahydrofuran, N-nitrosodimethylamine, dimethyl sulfite, propylene carbonate, gamma-butyrolactone, dimethyl carbonate, dimethoxy ethane, acetonitrile, dimethyl sulfoxide, dimethyl formamide, and mixtures thereof, and having dissolved therein soluble salts of said light metals.

2. The cell according to claim 1 wherein the electrolyte consists essentially of a solution of lithium perchlorate in tetrahydrofuran and the negative electrode consists essentially of lithium metal.

3. The cell according to claim 1 wherein the metal chromate is silver chromate.

4. The cell according to claim 1 wherein the metal chromate is copper chromate.

5. The cell according to claim 1 wherein the metal chromate is iron chromate.

6. The cell according to claim 1 wherein the metal chromate is cobalt chromate.

7. The cell according to claim 1 wherein the metal chromate is nickel chromate.

8. The cell according to claim 1 wherein the metal chromate is mercury chromate.

9. The cell according to claim 1 wherein the metal chromate is thallium chromate.

10. The cell according to claim 1 wherein the metal chromate is lead chromate.

11. The cell according to claim 1 wherein the metal chromate is bismuth chromate.

* * * * *